L. LEEDS.
Nut-Locks.
No. 146,081.  Patented Dec. 30, 1873.
Fig. 1.
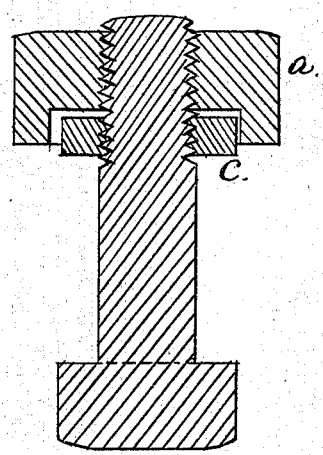
Fig. 2.  Fig. 3.
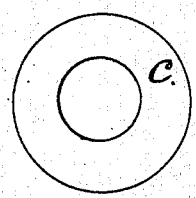  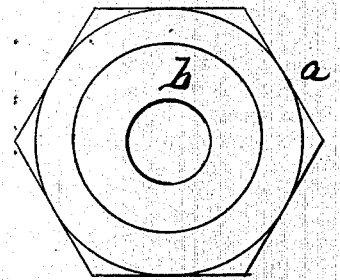
Witnesses:  Inventor:
W. Rivris  Lodowick Leeds.
J. Mason Goszler  By Attorney C. B. Towle

UNITED STATES PATENT OFFICE.

LODOWICK LEEDS, OF NEW LONDON, CONNECTICUT, ASSIGNOR OF ONE-HALF HIS RIGHT TO ELISHA W. SHOLES AND ALONZO W. SHOLES, OF SAME PLACE.

IMPROVEMENT IN NUT-LOCKS.

Specification forming part of Letters Patent No. 146,081, dated December 30, 1873; application filed June 23, 1873.

*To all whom it may concern:*

Be it known that I, LODOWICK LEEDS, of New London, in the county of New London and State of Connecticut, have invented a certain new and Improved Nut-Lock; and I do hereby declare the following to be a full, clear, and exact description of the invention, such as will enable others skilled in the art to which it pertains to make and use it, reference being had to the accompanying drawings, which form part of this specification.

Figure 1 is a vertical section of nut-lock complete. Fig. 2 is a plan view of inner nut detached from screw. Fig. 3 is a plan view of outer nut, showing the under side of the same, also detached from screw.

Like letters in the different figures of the drawings indicate like parts.

This invention relates to the combination of an inner and an outer nut, each with eccentric circles working on the same bolt, in such manner that when screwed in position they form one and the same nut, binding each other closely together, and fastening themselves securely to the screw of the bolt. The object of my invention is to produce a secure and reliable nut-lock for railway and other purposes. This nut when screwed in position on a bolt presents the appearance of an ordinary nut, the screw-thread being cut through the center of the outer or larger nut, and the exterior of the same being formed similar to ordinary nuts.

*a* is the outer or larger nut. *b* represents the socket made in the under side of the outer or larger nut. The socket-circle is eccentric, and its depth and diameter sufficient to receive the smaller or inner nut. *c* is the smaller or inner nut with a screw-thread cut to correspond in measurement with the screw-thread of the larger nut, the circumference of said smaller nut, as well as the circle upon which the screw-thread is cut, being eccentrical. The thickness of the inner nut is made equal to the depth of the socket in the outer nut.

To affix my nut-lock to a screw, place the smaller nut within the larger one, in such position that the screw-threads of each will be in a line to receive the screw on the bolt, and then screw the nut to its position the same as an ordinary nut.

The manner of shaping the socket *b* of the larger nut, taken in connection with the form of the smaller nut, causes the binding of the two in such manner as to securely lock themselves together, and at the same time lock the combined nut to the screw of the bolt, thus forming an invaluable nut for fish-joint bolts, or other purposes, where a secure lock-nut is required.

What I claim as my invention, and desire to secure by Letters Patent, is—

The outer nut *a*, having an eccentric circular recess or slot, *b*, to receive the eccentric inner nut *c*, in combination with the bolt, when constructed and arranged in the manner and for the purposes as herein shown and set forth.

In testimony that I claim the foregoing I have hereunto set my hand and seal this 21st day of April, 1873.

L. LEEDS. [L. S.]

Witnesses:
 WM. H. SHIELDS,
 JOSEPH HOLMES.